United States Patent [19]

Shirai et al.

[11] 4,274,258
[45] Jun. 23, 1981

[54] DUST-BOOT FOR A VACUUM BOOSTER

[75] Inventors: Akira Shirai, Toyoake; Sigeo Nagasawa, Toyota, both of Japan

[73] Assignee: Toyota Jidosha Kogyo Kabushiki Kaisha, Aichi, Japan

[21] Appl. No.: 922,733

[22] Filed: Jul. 7, 1978

[30] Foreign Application Priority Data

Jul. 9, 1977 [JP] Japan .............................. 52/91297[U]

[51] Int. Cl.³ ........................... F15B 9/10; F16J 15/18
[52] U.S. Cl. ................................ 60/547 R; 91/369 A; 91/376 R; 92/168; 181/230
[58] Field of Search ............. 91/369 A, 369 B, 369 R, 91/376 R; 181/230; 92/168, 78; 74/18.1, 18.2; 60/547 R

[56] References Cited

U.S. PATENT DOCUMENTS

| 4,022,112 | 5/1977 | Putt et al. ........................... 91/369 A |
| 4,103,590 | 8/1978 | Putt ........................................ 92/78 |

Primary Examiner—Paul E. Maslousky
Attorney, Agent, or Firm—Borwdy and Neimark

[57] ABSTRACT

A dust-boot for a vacuum booster, which is partly protruded into the driver's room, characterized in being provided with a noise preventing wall firmly formed in such a mode, that it covers the air-sucking hole(s) to prevent the air-sucking noise from directly reaching the driver's ears, through the formation of an air flowing passage between the wall and the outer surface of the dust-boot main body, which air flowing passage is different in the direction of the air flow from that at the air-sucking hole(s) and bent or wound at least once on the way.

17 Claims, 5 Drawing Figures

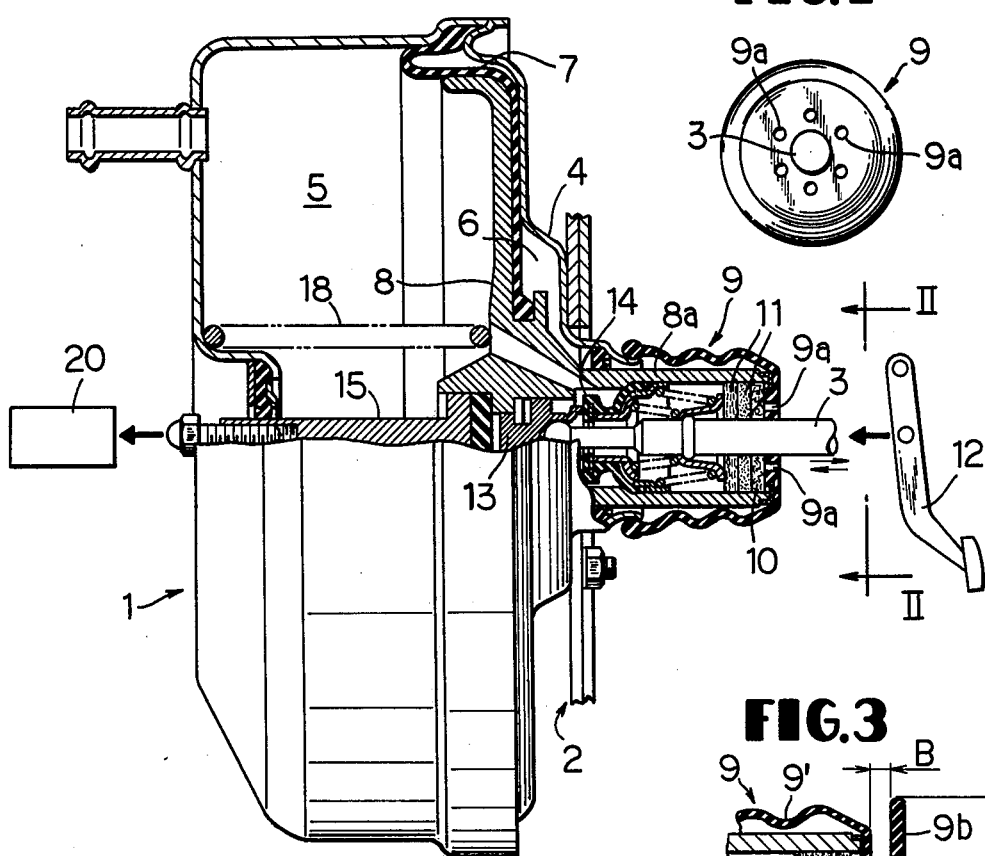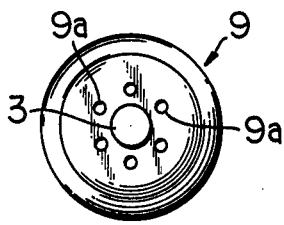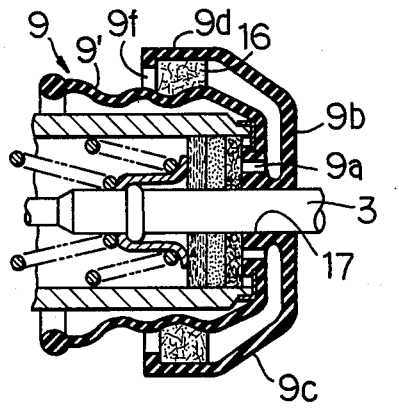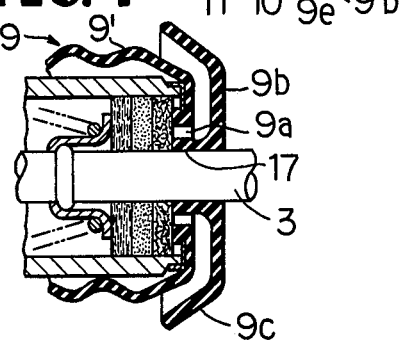

DUST-BOOT FOR A VACUUM BOOSTER

BACKGROUND OF THE INVENTION

The present invention relates to a dust-boot for a booster used in a vehicle, more particularly, to an improved dust-boot provided with a noise preventing (when air is sucked) wall of plate type.

It is widely practiced to employ a vacuum booster (hereinafter simply called booster), as a sort of servo-mechanism, for getting a strong braking force under a light braking operation. When this booster, partly projecting into the cabin, i.e., projecting from the dash-panel into the driver's room, is actuated, rapidly sucked air through the air-sucking hole (or holes), which is formed in the dust-boot covering the above-mentioned projected portion of the booster, produces a kind of intermittent sucking noise. This noise caused by an eddy turbulence of air is directly delivered to the driver, without being damped, to his great disagreeableness, because the noise source is exposed, without any cover, to the driver's ears.

As a countermeasure against this noise problem, provision of silencers made of a layer of various fibers, and of air cleaners made of filter paper, filter cloth, etc., inside the air-sucking hole(s), has been tried with no satisfactory results.

The reason for this problem having been closed up resides in that the size of the booster has gradually been enlarged for enhancing the performance of the brake system and for decreasing the brake pedal depressing force. It can be well understood that the volume of air sucked rapidly increased in consequence, bringing about the increase of the noise, and on the other hand the driver's assessment for the noise prevention effects has become sensitive.

SUMMARY OF THE INVENTION

It is therefore a primary object of this invention to provide a dust-boot, having a noise preventing wall, for a vacuum booster.

It is another object of this invention to provide a dust-boot having a noise preventing wall, for a vacuum booster of a vehicle, wherein the noise preventing wall is attached to the main body of the dust-boot to mitigate the air-sucking noise when the same is in operation.

It is still another object of this invention to enhance the air-sucking-noise-preventing effect, which noise is produced at the air-sucking hole(s) in the dust-boot main body, and thereby to eliminate the disagreeable feeling, to the driver, due to such air-sucking noise.

Other objects and advantages of this invention will be apparent from the later stated detailed description of the embodiments with reference to the appended drawings.

This noise preventing purpose of this invention can be realized, to say in a word, by providing a wall member in such a mode that it covers the air-sucking hole(s) and forming an air flowing passage different in the direction of the air flow from that at the air-sucking hole(s), by means of being bent or wound at least once on the way.

BRIEF DESCRIPTION OF THE DRAWINGS

FIG. 1 is a vertical cross-section, in elevation, of a conventional vacuum booster, partly broken away (prior art);

FIG. 2 is a projection of a part of the vacuum booster (in FIG. 1), seen from the position indicated by the line II—II (prior art);

FIG. 3 is a vertical cross-section, in elevation, of an essential part of a first embodiment of the dust-boot in accordance with this invention;

FIG. 4 is a vertical cross-section, in elevation, of an essential part of a second embodiment of the dust-boot in accordance with this invention; and FIG. 5 is a vertical cross-section, in elevation, of an essential part of a third embodiment of the dust-boot in accordance with this invention.

DETAILED DESCRIPTION OF THE PREFERRED EMBODIMENTS

For better understanding, construction and operation of a booster will be described on a conventional one illustrated in FIG. 1, before entering the explanation of the preferred embodiments.

A booster 1 is located in the engine room side of a vehicle and attached on a dash-panel 2, with a part thereof around an operating rod 3 being projected into the cabin (on the side of the driver's room). A main body 1 of the booster is enveloped in a shell 4, which body being divided into two parts, i.e., a negative-pressure chamber 5 and a variable-pressure chamber 6, by a diaphragm 7.

A power piston 8, which supports the diaphragm 7, is partly extended beyond the dash-panel 2 into the cabin as a cylindrical sliding portion 8a, which is capped and protected by a dust-boot 9, made of an elastic material such as rubber, of cylindrical form with a bottom. On the end surface (bottom portion) of the dust-boot 9, on the side of a brake pedal 12, a plurality of air-sucking holes 9a, 9a ... are concentrically formed, with an equal circumferential angular distance to each other, with the operating rod 3 as shown in FIG. 2. Inside the sliding portion 8a of the piston 8, that is, inside the dust-boot bottom, is disposed just in contact therewith a silencer 10 made of various fibers and a plurality of air cleaners 11 made of filter paper, filter cloth, etc. closely placed in layers in the axial direction of the operating rod 3.

Both the negative-pressure chamber 5 and the variable-pressure chamber 6 are usually under the influence of vacuum pressure, so the piston 8 is constantly urged rightwards by a return spring 18, in the status shown in FIG. 1. When the brake pedal 12 is depressed, the operating rod 3 is shifted leftwards to urge an air valve 13 in a direction of separating the same from a control valve 14, which causes a flow-in of atmospheric air into the variable-pressure chamber 6 through a passage which is not shown. The pressure difference between the atmospheric pressure in the variable-pressure chamber 6 and the vacuum pressure in the negative-pressure chamber 5 urges the power piston 8 leftwards to impart a strong thrust on a push rod 15. This leftward shifting of the push rod 15 thus actuated is transferred to the well-known master cylinder 20 for delivering the brake fluid to each braking mechanism. The problem questioned lies in the noise produced by the air introduced to the variable-pressure chamber 6 at the air-sucking hole(s) 9a. Although the silencer 10 and the air cleaner 11 are effective in the noise prevention for the sound within the booster, the noise at the air-sucking portion is left utterly unsolved.

This invention is to solve the very question, which is in essence to cover the noise source with a noise preventing wall of a circular plate member 9b in FIG. 3, having the same axis of symmetry with the dust-boot main body 9′. The wall (plate member) 9b is disposed, with a distance B spaced from the air-sucking hole(s) 9a, on the brake pedal side of the dust-boot main body 9′, being integrally formed with the main body 9′ surrounding a through bore 17 for the operating rod 3. This wall 9b for covering the air-sucking hole(s) 9a is so designed as to properly select the distance B and the radius R for not giving an acute variation of the cross-sectional area of the passage for the sucked air, i.e., to render the same gradually and smoothly decreased. For the same reason the cross-sectional area of the air-sucking hole(s) is preferable to be of an elongated sector form or a crescent-like form, instead of a circular form.

The inside surface 9′b of the wall 9b and the outer surface 9e of the dust-boot main body 9′ confronted therewith are preferable to be as coarse as possible. For making these surfaces coarse a few suitable methods are practiced. One is, for example, to make the inside surface of the molding dies coarse or rugged in advance, when molding is utilized for preparing these members. Another is to coarsen or make rugged the molded members afterwards, by means of conventionally well-known surface coarsening processes. The wall 9b may be however separately manufactured to be attached afterwards to the dust-boot main body 9′, wherein the working of the coarse surface is advantageously easy.

In this first embodiment of such a construction, air-sucking noise runs against the wall 9b to be changed its direction approximately 90°, a part of which energy being transformed into heat energy. It results in muffling the sound zone of high frequency, and damping of sound pressure, due to reflection and diffusion of sound waves between the coarse surfaces on opposite sides. Besides, the air-sucking noise is damped by the detour of the transit course, instead of direct arriving thereof to the driver's ears. Making the air-sucking hole(s) round at the mouth by removing the edge, that is rounding off the angles of the hole entrance is effective in reducing the eddy turbulence of air and muffling the noise.

In a second embodiment shown in FIG. 4, the noise preventing wall is provided with, in addition to the circular plate wall 9b, a slantwise extension 9c along with a slope portion of the end surface of the dust-boot main body 9′ for forming a truncated conical shape in the extension alone. It is effective in muffling the noise, because the additional extension makes the passage of the noise bent and longer to enhance the noise preventing capability, and furthermore it changes the position and direction of the sound outgoing to more remote and indirect to the driver's ears.

FIG. 5 illustrates a third embodiment, in which the noise preventing wall is further extended, in addition to the extension 9c in the second embodiment, in the axial direction parallel to the operation rod 3, that is to say, an extension of cylindrical shape 9d attached to the end of the slope portion (slantwise extension 9c). The extension of cylindrical shape 9d is a cylindrical wall member extending concentrically with the main body 9′ of the dust-boot 9. This wall is therefore composed of three portions, 9b, 9c, and 9d. The third embodiment thus makes the passage of the air-sucking noise more complicated and bent for leading the direction of the sound outgoing to a turnabout by 180° from the sound source. Besides, a silencer 16 made of a fiber layer of a predetermined thickness is disposed, in addition to the silencer within the dust-boot 9 main body 9′, between the outer surface of the main body 9′ and the inner surface of the cylindrical wall portion 9d. Disposition of a silencer 16 exclusively for the air-sucking hole(s) 9a enhances the sound muffling effect, in cooperation with the above-mentioned reversing of the direction of the opening for the sound outgoing. An air inlet 9f disposed at the end of the cylindrical wall 9d is made much larger in the cross-sectional area than the air-sucking hole(s) 9a.

In summarizing the invention, it can be said to have solved the noise preventing problem only by disposing a wall of a simple circular plate, or with one extension, or further with double extensions. Extending, bending, and reversing direction of the sound outgoing passage have been proved to be highly effective, with the aid of reflection and diffusion of sound waves by the coarse surface of the wall, and the disposition of the silencer and the air cleaner, in noise preventing. It takes only a small space, and an integral formation of the wall with the dust-boot main body itself makes the manufacturing process easy and the cost therefor inexpensive. Further increase of bending portions of the sound passage, increase of coarse surface, or increase of silencers are all quite easy to be executed at will for enhancing the effect more.

The above embodiments are all described only for examples, so the invention should not be construed to be limited to the description and the drawings attached. Variations and modifications are practicable without departing from the spirit and the scope of the invention to those skilled in the art.

What is claimed is:

1. A dust-boot for capping to protect a sliding portion of a power piston for a vacuum booster means which sliding portion protrudes from a dash-panel into a driver's compartment of a vehicle having a forward compartment, the dash-panel separating the driver's compartment from the forward compartment and the piston delivering a pedal-depressing force after having boosted the same to a master cylinder, the dust boot comprising a main body having a major surface provided with at least one air sucking aperture therein in fluid communication with said driver's compartment, said at least one aperture having a given axis along a given air flow path; a firmly formed noise-preventing wall spaced from said main body of the dust-boot and in said driver's compartment said noise-reducing wall being spaced from said major surface, extending over said at least one air-sucking aperture in spaced relation therewith and thus defining with said major surface an air flow passage from the driver's compartment which is dissimilar in direction of air flow from that of said given air flow path of said at least one air-sucking aperture in the outgoing direction of air flow from said driver's compartment, whereby air-sucking sounds reaching the driver by a linear path are at least reduced.

2. A dust-boot in accordance with claim 1, wherein said noise-reducing wall is integrally made with the main body of said dust-boot.

3. A dust-boot in accordance with claim 1, including inside the sliding portion of said power piston, at least one layer of silencer made of fiber, and at least one layer of air cleaner stacked one upon another, said at least one layer of silencer being disposed in contact with the inside edge of the at least one air-sucking aperture.

4. A dust-boot in accordance with claim 1, wherein confronting surfaces of the main body of the dust-boot and said noise reducing wall are all made coarse to a great extent.

5. A dust-boot in accordance with claim 1, wherein said sliding portion comprises a piston rod having an axis, said axis of said piston rod defining an axis of symmetry of said main body of said dust boot and wherein said noise reducing wall is a circular plate member having an axis of symmetry identical to said axis of symmetry of said main body of the dust-boot.

6. A dust-boot in accordance with claim 5, or claim 4, wherein said noise reducing wall is integrally made with the main body of said dust-boot.

7. A dust boot in accordance with claim 5, including, inside the sliding portion of said power piston, at least one layer of silencer made of fiber and at least one layer of air cleaner stacked one upon another, said at least one layer of silencer being disposed in contact with the inside edge of said at least one air-sucking aperture.

8. A dust-boot in accordance with claim 5, wherein confronting surfaces of said main body of the dust-boot and said noise reducing wall are all made coarse to a great extent.

9. A dust-boot in accordance with claim 1, wherein said noise reducing wall is composed of a circular plate member having an axis of symmetry identical to that of said main body of the dust boot, a wall member of truncated concical shape extending slantwise along a slant surface of said main body of the dust boot in a separating direction from a brake pedal.

10. A dust-boot in accordance with claim 9, wherein said noise reducing wall is integrally made with the main body of said dust-boot.

11. A dust boot in accordance with claim 9, including, inside the sliding portion of said power piston, at least one layer at least one layer of air cleaner stacked one upon another, said at least one layer of silencer being disposed in contact with the inside edge of said at least one air-sucking aperture.

12. A dust-boot in accordance with claim 11, wherein confronting surfaces of said main body of the dust-boot and said noise reducing wall are all made coarse to a great extent.

13. A dust-boot in accordance with claim 9, wherein said sliding portion comprises a piston rod having an axis, said axis of said piston rod defining an axis of symmetry of said main body of the dust-boot, and wherein said noise reducing wall is composed of a circular plate member having an axis of symmetry identical to said axis of symmetry of said main body of the dust-boot, a wall member of truncated conical shape extending slantwise along a slant surface of said main body of the dust-boot in a separating direction from a brake pedal, and a cylindrical wall extending concentrically with said main body of the dust-boot.

14. A dust-boot in accordance with claim 13, wherein said noise preventing wall is integrally made with the main body of the dust-boot.

15. A dust-boot in accordance with claim 13 including, inside the sliding portion of said power piston, at least one layer of silencer made of fiber and at least one layer of air cleaner stacked one upon another, said at least one layer of silencer being disposed in contact with the inside edge of said at least one air-sucking aperture.

16. A dust-boot in accordance with claim 13, wherein confronting surfaces of said main body of the dust-boot and said noise reducing wall are all made coarse to a great extent.

17. A dust-boot in accordance with claim 13, including a silencer made of a layer of fiber between the inside of said cylindrical form wall portion and the outer surface of said main body of the dust-boot.

* * * * *